United States Patent
Tylik et al.

(10) Patent No.: US 10,789,018 B2
(45) Date of Patent: Sep. 29, 2020

(54) SUPPORTING NON-DISRUPTIVE MOVEMENT OF A LOGICAL VOLUME OF NON-VOLATILE DATA STORAGE BETWEEN STORAGE APPLIANCES

(71) Applicant: EMC IP Holding Company LLC, Hopkinton, MA (US)

(72) Inventors: Dmitry Tylik, Westborough, MA (US); Matthew H. Long, Uxbridge, MA (US); Daniel E. Cummins, Hudson, NH (US); Nagasimha Haravu, Apex, NC (US); Kenneth Hu, Lexington, MA (US); Matthew Eaton, Mansfield, MA (US); Matthew Jean, Shirley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 16/176,819

(22) Filed: Oct. 31, 2018

(65) Prior Publication Data

US 2020/0133584 A1    Apr. 30, 2020

(51) Int. Cl.
*G06F 12/00* (2006.01)
*G06F 3/06* (2006.01)

(52) U.S. Cl.
CPC .......... *G06F 3/0665* (2013.01); *G06F 3/0604* (2013.01); *G06F 3/065* (2013.01); *G06F 3/0635* (2013.01); *G06F 3/0679* (2013.01)

(58) Field of Classification Search
CPC ...... G06F 3/0665; G06F 3/065; G06F 3/0679; G06F 3/0635; G06F 3/0604; G06F 3/067; G06F 3/0617; G06F 3/0647

(Continued)

(56) References Cited

U.S. PATENT DOCUMENTS 8,060,775 B1   11/2011  Sharma et al.
8,219,769 B1 *  7/2012  Wilk .................. G06F 11/1464
                                                            707/640

(Continued)

OTHER PUBLICATIONS

Schluting, Charlie, "Storage Networking 101: Understanding Fibre Channel," Enterprise Networking Planet, 2018 QuinStreet, Inc., Published Jul. 12, 2017, <<http://www.enterprisenetworkingplanet.com/netsp/article.php/3688326/Storage-Networking-101-Understanding-Fibre-Channel.htm>> accessed on Nov. 6, 2018, 2 pages.

(Continued)

*Primary Examiner* — Mardochee Chery
(74) *Attorney, Agent, or Firm* — BainwoodHuang

(57) ABSTRACT

A primary copy and one or more shadow copies of a logical volume are created and discovered by a host rescan performed when the logical volume is initially created. Data storage resources are allocated to the primary copy, but not to the shadow copy. The initial path state of the logical volume describes the path to the primary copy as active, and the path to the shadow copy as unavailable for accessing the logical volume. Movement of the logical volume to the storage appliance providing the shadow copy can be performed without an additional host rescan, by making the shadow copy the new primary copy, making the primary copy a new shadow copy, and updating the path state of the logical volume to indicate i) that the path to the new primary copy is active, and ii) that the path to the new shadow copy is unavailable.

15 Claims, 5 Drawing Sheets

(58) Field of Classification Search
USPC .......................................................... 711/100
See application file for complete search history.

(56) References Cited

U.S. PATENT DOCUMENTS 8,930,620 B2    1/2015   Vemuri et al.
9,176,902 B1    11/2015  Long et al.

OTHER PUBLICATIONS

"iSCSI Technical White Paper," SNIA IP Storage Forum, iSCSI Technical Overview, Nov. 2001, <<http://www.cs.uml.edu/~bill/cs520/iSCSI_Technical_whitepaper.pdf>>accessed Nov. 6, 2018, 10 pages.

\* cited by examiner

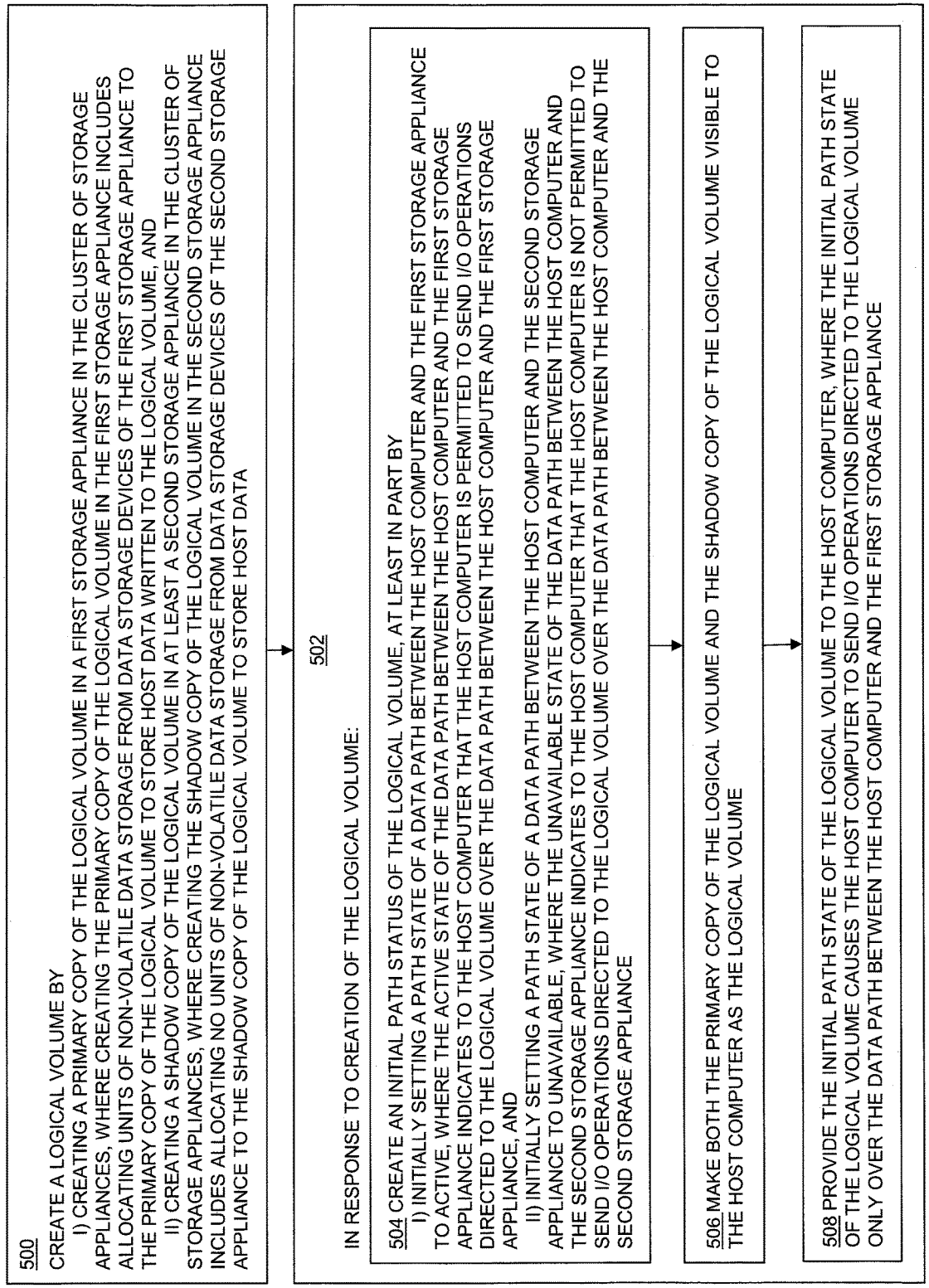

SUPPORTING NON-DISRUPTIVE MOVEMENT OF A LOGICAL VOLUME OF NON-VOLATILE DATA STORAGE BETWEEN STORAGE APPLIANCES

TECHNICAL FIELD

The present disclosure relates generally to techniques for providing logical volumes of non-volatile data storage to host computer systems, and more specifically to technology for supporting non-disruptive movement of a logical volume between storage appliances.

BACKGROUND

Data storage systems are arrangements of hardware and software that typically provide non-volatile data storage from non-volatile data storage devices that they contain or are communicably connected to, such as magnetic disk drives, electronic flash drives, and/or optical drives. Data storage systems service host I/O operations (e.g. I/O reads, writes, etc.) that they receive from host computers. The received host I/O operations specify one or more data storage objects (e.g. logical volumes, sometimes also referred to as logical units or "LUNs"), and indicate host I/O data that is to be written to or read from the storage objects. Data storage systems include specialized hardware and execute specialized software that process incoming host I/O operations and perform various data storage tasks to organize and secure the host I/O data that is received from the host computers and store the received host I/O data on the non-volatile data storage devices of the data storage system. Data storage systems may sometimes include or consist of a cluster of data storage appliances.

Under various types of circumstances, it may be desirable to change the location of a logical volume, e.g. from a first data storage appliance to a second data storage appliance within a cluster of data storage appliances. Examples of such circumstances include without limitation resource imbalances that may arise between different data storage appliances, such as an inadequate amount of resources (e.g. storage, processing, and/or network resources) being available to support the logical volume on a first data storage appliance, and a sufficient or more sufficient amount of resources being available to support the logical volume on a second data storage appliance.

SUMMARY

Previous technologies for moving the location of a logical volume have exhibited significant technical shortcomings. For example, some previous technologies have operated such that when a logical volume was moved, a rescan operation had to be performed at the time of the move on each host computer that used the logical volume in order for the hosts to start accessing the logical volume from the new location. In some previous systems, such rescan operations performed at the time of a logical volume move had to be done manually on each host computer, e.g. by a storage administrator user, and also sometimes required that the storage administrator determine the current set of host computers that use the logical volume. The time consumed to perform rescan operations at each host computer that uses a logical volume at the time the logical volume is moved may cause a significant disruption in the flow of I/O operations between host computers and the logical volume, during which critical data on the logical volume may become unavailable to applications executing on the host computer, potentially causing such applications to fail.

To address the above described and/or other shortcomings of previous technologies, new technology is disclosed herein for supporting movement of a logical volume (e.g. a block based logical volume of non-volatile data storage sometimes also referred to as a logical unit or "LUN") between storage appliances. In the disclosed technology, a logical volume is created at least in part by i) creating a primary copy of the logical volume in a first storage appliance in a cluster of storage appliances, and ii) creating a shadow copy of the logical volume in a second storage appliance in the cluster of storage appliances. Creating the primary copy of the logical volume in the first storage appliance includes allocating units of non-volatile data storage from data storage devices of the first storage appliance to the primary copy of the logical volume to store host data written to the logical volume. Creating the shadow copy of the logical volume in the second storage appliance includes allocating no units of non-volatile data storage from data storage devices of the second storage appliance to the shadow copy of the logical volume to store host data.

In response to creation of the logical volume, an initial path state of the logical volume is also created at the time the logical volume is created. The initial path state is created by i) initially setting a path state of a data path between the host computer and the first storage appliance to an active state, and ii) initially setting a path state of a data path between the host computer and the second storage appliance to unavailable. The active state of the data path between the host computer and the first storage appliance indicates to the host computer that the host computer is permitted to send I/O operations (e.g. I/O read and/or I/O write operations) directed to the logical volume over the data path between the host computer and the first storage appliance. The unavailable state of the data path between the host computer and the second storage appliance indicates to the host computer that the host computer is not permitted to send I/O operations directed to the logical volume over the data path between the host computer and the second storage appliance.

Further in response to creation of the logical volume, both the primary copy of the logical volume and the shadow copy of the logical volume are made visible to the host computer as the logical volume at the time the logical volume is created. For example, the primary copy of the logical volume and the shadow copy of the logical may be made visible to the host computer when a rescan operation is performed on the host computer at the time the logical volume is created. The initial path state of the logical volume is also provided to the host computer at the time the logical volume is created, e.g. in response to host inquiries performed at the time of creation of the logical volume. The initial path state of the logical volume provided to the host computer causes the host computer to send host I/O operations directed to the logical volume only over the data path between the host computer and the first storage appliance.

In some embodiments, the logical volume has a unique name, and making both the primary copy of the logical volume and the shadow copy of the logical volume visible to the host computer as the logical volume also includes providing the unique name of the logical volume to the host computer as a name for both the primary copy of the logical volume and the shadow copy of the logical volume, e.g. in response to status inquiries or the like received from the host computer. The unique name of the logical volume may be a Small Computer System Interface (SCSI) World Wide Name (WWN) of the logical volume, and providing the unique name of the logical volume to the host computer as a name for the primary copy of the logical volume may, for example, be performed by sending the WWN of the logical volume to the host computer as the name of the primary copy of the logical volume as part of a Vital Product Data (VPD) page that is related to the primary copy of the logical volume, and that is sent to the host computer in response to a SCSI inquiry VPD page command sent from the host computer and directed to the primary copy of the logical volume. Providing the unique name of the logical volume to the host computer as a name for the shadow copy of the logical volume may similarly be performed by sending the WWN of the logical volume to the host computer as the name of the shadow copy of the logical volume as part of a VPD page that is related to the shadow copy of the logical volume, and that is sent to the host computer in response to a SCSI inquiry VPD page command sent from the host computer and directed to the shadow copy of the logical volume.

In some embodiments, providing the initial path state of the logical volume to the host computer may include providing the initial path state of the logical volume to the host computer in response to both i) a status inquiry sent from the host computer and directed to the primary copy of the logical volume, and ii) a status inquiry sent from the host computer and directed to the shadow copy of the logical volume. In some embodiments, the status inquiry sent from the host computer and directed to the primary copy of the logical volume may be an RTPG command sent from the host computer and directed to the primary copy of the logical volume, and the status inquiry sent from the host computer and directed to the shadow copy of the logical volume may be an RTPG command sent from the host computer and directed to the shadow copy of the logical volume. Providing the initial path state of the logical volume to the host computer may be accomplished by sending the initial path state of the logical volume to the host computer both i) as part of an ALUA state related to the primary copy of the logical volume and sent to the host computer in response to the RTPG command sent from the host computer and directed to the primary copy of the logical volume, and ii) as part of an ALUA state related to the shadow copy of the logical volume and sent to the host computer in response to the RTPG command sent from the host computer and directed to the shadow copy of the logical volume.

In some embodiments, the data path between the host computer and the first storage appliance may extend at least in part between an initiator port on the host computer and a target port on the first storage appliance. The data path between the host computer and the second storage appliance may similarly extend at least in part between an initiator port on the host computer and a target port on the second storage appliance.

In some embodiments, host access to the logical volume may be moved from the first storage appliance to the second storage appliance during a relocation operation performed in response to receipt of a relocation command. The relocation operation is performed at least in part by creating an updated path state for the logical volume. Creating the updated path state for the logical volume may include i) updating the path state of the data path between the host computer and the first storage appliance to unavailable, the unavailable state of the data path between the host computer and the first storage appliance indicating to the host computer that the host computer is not permitted to send I/O operations directed to the logical volume over the data path between the host computer and the first storage appliance, and ii) updating the path state of the data path between the host computer and the second storage appliance to an active state, the active state of the data path between the host computer and the second storage appliance indicating to the host computer that the host computer is permitted to send I/O operations directed to the logical volume over the data path between the host computer and the second storage appliance. In response to creation of the updated path state for the logical volume, the primary copy of the logical volume may be changed to a new shadow copy of the logical volume, and the shadow copy of the logical volume may be changed to a new primary copy of the logical volume. The updated path state of the logical volume may then be provided to the host computer. The updated path state of the logical volume provided to the host computer causes the host computer to subsequently send I/O operations directed to the logical volume only over the data path between the host computer and the second storage appliance.

In some embodiments, moving host access to the logical volume from the first storage appliance to the second storage appliance may include allocating units of non-volatile data storage from data storage devices of the second storage appliance to the new primary copy of the logical volume to store host data written to the logical volume.

In some embodiments, moving host access to the logical volume from the first storage appliance to the second storage appliance may further include moving host data stored in the units of non-volatile data storage allocated from data storage devices of the first storage appliance to the primary copy of the logical volume to the units of non-volatile data storage allocated from the data storage devices of the second storage appliance to the new primary copy of the logical volume.

The disclosed technology may be embodied to provide significant advantages over previous technologies. For example, because both the primary and shadow copies of the logical volume are visible to the host through a rescan operation performed on the host computer at the time that the logical volume is created, any subsequent movement of the logical volume between the storage appliance providing the primary copy and the storage appliance providing the shadow copy is anticipated. In the event that the logical volume is eventually moved between to the storage appliance providing the shadow copy of the logical volume, there is no need to notify the host computer, or the host computer's system administrator, in order for another rescan to be performed on the host to discover the new primary copy of the logical volume on the storage appliance to which the logical volume was moved, since the host computer already has knowledge of both the primary and shadow copy of the logical volume from the rescan performed when the logical volume was initially created. The storage administrator does not need to manually perform a rescan operation from each host computer that accesses the logical volume to find the new location of the logical volume at the time host access to the logical volume is moved. The storage administrator accordingly need not determine which host computers are accessing the logical volume at that time. The movement of the logical volume may in fact be fully automated between the storage appliances, transparently with regard to the host computer and/or host computer system administrator. The disclosed technology eliminates the significant delays that could occur in previous systems as a result of performing rescan operations at each host computer at the time the logical volume is moved. The disclosed technology accordingly eliminates the disruption in the flow of I/O operations between host computers and the logical volume caused by such rescans, during which data on the logical volume may become unavailable to applications executing on the host computer. The disclosed technology accordingly eliminates the potential for those applications to fail as a result of such data unavailability.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is a flow chart showing an example of steps performed in some embodiments.

DETAILED DESCRIPTION

Figure 1:
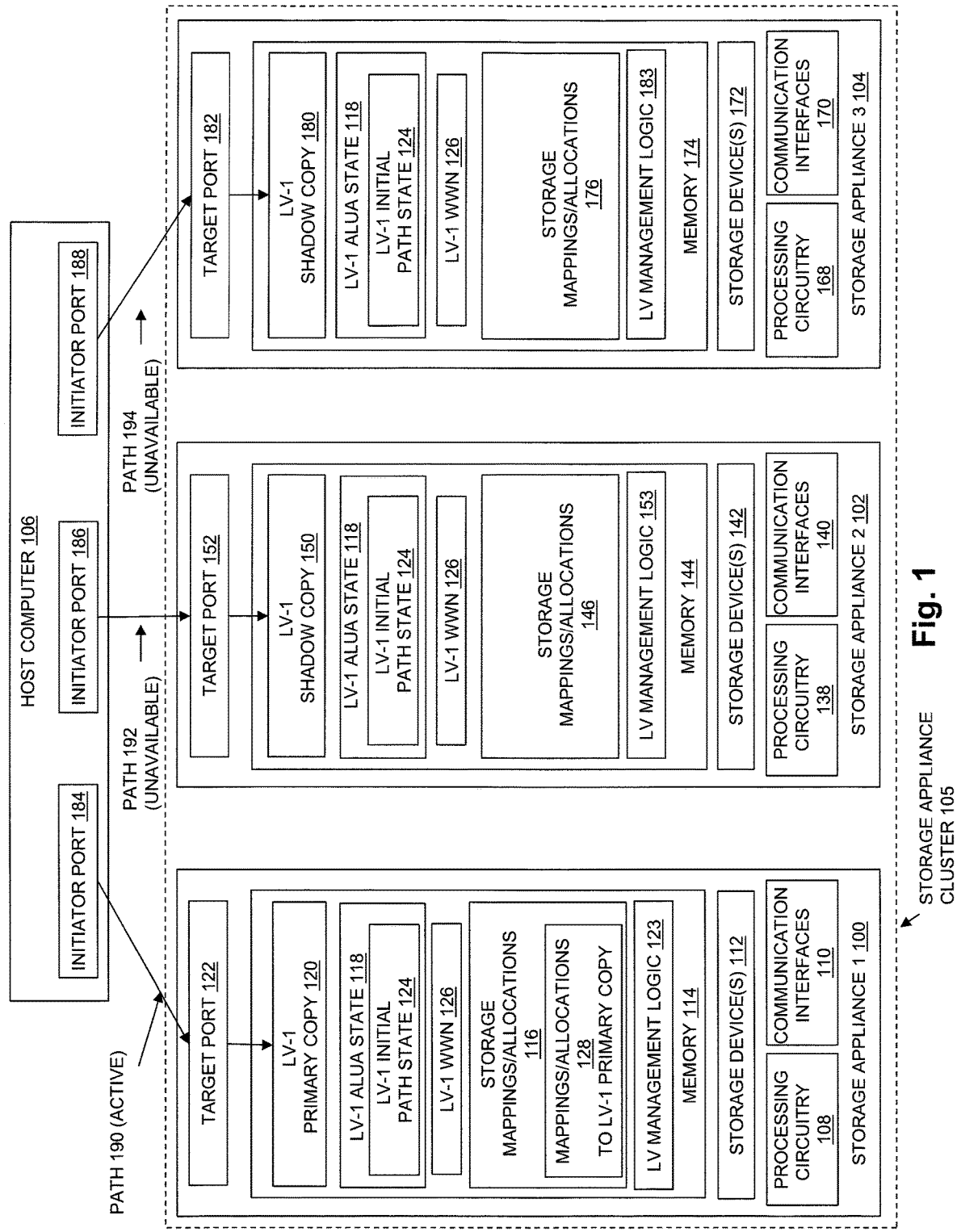
FIG. 1 is a block diagram showing an example of an operational environment including an embodiment of the disclosed technology, at the time a logical volume is created.

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. The description in this document is intended to provide support for all such combinations, permutations and/or variations.

As described herein, a logical volume is created by i) creating a primary copy of the logical volume in a first storage appliance in a cluster of storage appliances, and ii) creating a shadow copy of the logical volume in a second storage appliance in the cluster of storage appliances. Creating the primary copy of the logical volume in the first storage appliance includes allocating units of non-volatile data storage from data storage devices of the first storage appliance to the primary copy of the logical volume to store host data written to the logical volume. Creating the shadow copy of the logical volume in the second storage appliance includes allocating no units of non-volatile data storage from data storage devices of the second storage appliance to the shadow copy of the logical volume to store host data.

At the time the logical volume is created, in response to creation of the logical volume, an initial path state of the logical volume is also created. The initial path state is created by i) initially setting a path state of a data path between the host computer and the first storage appliance to an active state, and ii) initially setting a path state of a data path between the host computer and the second storage appliance to unavailable. The active state of the data path between the host computer and the first storage appliance indicates to the host computer that the host computer is permitted to send I/O operations (e.g. read I/O operations and/or write I/O operations) that are directed to the logical volume over the data path between the host computer and the first storage appliance. The unavailable state of the data path between the host computer and the second storage appliance indicates to the host computer that the host computer is not permitted to send I/O operations directed to the logical volume over the data path between the host computer and the second storage appliance.

Also at the time the logical volume is created, in response to creation of the logical volume, both the primary copy of the logical volume and the shadow copy of the logical volume are made visible to the host computer as the logical volume. For example, the primary copy of the logical volume and the shadow copy of the logical may be made visible to the host computer when a SCSI rescan operation is performed by the host computer at the time the logical volume is created. The initial path state of the logical volume is also provided to the host computer at the time the logical volume is created, e.g. in response to one or more inquiries received from the host computer creation of the logical volume. The initial path state for the logical volume provided to the host computer causes the host computer to send I/O operations that are directed to the logical volume only over the data path between the host computer and the first storage appliance.

FIG. 1 is a block diagram showing an example of components in an operational environment including an embodiment of the disclosed technology. As shown in FIG. 1, a Storage Appliance Cluster 105 includes multiple storage appliances, shown for purposes of illustration by Storage Appliance 1 100, Storage Appliance 2 102, and Storage Appliance 3 104. While in the example of FIG. 1 Storage Appliance Cluster 105 includes three storage appliances, the technology disclosed herein is not limited to storage appliance clusters made up of that specific number of storage appliances, and may be embodied in storage appliance clusters that include other specific numbers of storage appliances.

Each one of the storage appliances in the Storage Appliance Cluster 105 contains and/or is communicably coupled to one or more non-volatile data storage devices, such as one or more magnetic disk drives, one or more electronic flash drives, and/or one or more optical drives. In the example of FIG. 1, Storage Appliance 1 100 is shown including Storage Devices 112, Storage Appliance 2 102 is shown including Storage Devices 142, and Storage Appliance 3 104 is shown including Storage Devices 172.

Each one of the storage appliances in the Storage Appliance Cluster 105 also includes communication circuitry operable to connect to, and to transmit and receive data signals over, a communication network connecting the storage appliances to Host Computer 106. In the example of FIG. 1, Storage Appliance 1 100 is shown including Communication Interfaces 110, Storage Appliance 2 102 is shown including Communication Interfaces 140, and Storage Appliance 3 104 is shown including Communication Interfaces 170. Communication Interfaces 110, Communication Interfaces 140, and Communication Interfaces 170 may each include or consist of SCSI target adapters and/or network interface adapters or the like for converting electronic and/or optical signals received over the network connecting each one of the storage appliances to Host Computer 106 into electronic form for use by the respective storage appliance.

For example, communications between the storage appliances in Storage Appliance Cluster 105 may be performed using the Small Computer System Interface (SCSI) protocol, through paths in a communication network connecting the Host Computer 106 and the storage appliances. The paths may include or consist of paths between SCSI initiator ports in the Host Computer 106 and SCSI target ports in the communication interfaces of the storage appliances. For example, Host Computer 106 may include one or more SCSI host adapters, having some number of initiator ports. In the example of FIG. 1, for purposes of illustration, Host Computer 106 is shown including Initiator Port 184, Initiator Port 186, and Initiator Port 188. The communication interfaces of each storage appliance may include SCSI target adapters having some number of target ports. In the example of FIG. 1, for purposes of illustration, Storage Appliance 1 100 is shown including Target Port 122, Storage Appliance 2 is shown including Target Port 152, and Storage Appliance 3 104 is shown including Target Port 182.

Each one of the storage appliances in the Storage Appliance Cluster 105 includes processing circuitry for executing program code. In the example of FIG. 1, Storage Appliance 1 100 is shown including Processing Circuitry 108, Storage Appliance 2 102 is shown including Processing Circuitry 138, and Storage Appliance 3 104 is shown including Processing Circuitry 168. Processing Circuitry 108, Processing Circuitry 138, and Processing Circuitry 168 may each include or consist of one or more central processing units (CPUs) and associated electronic circuitry.

Each one of the storage appliances in the Storage Appliance Cluster 105 also includes a memory operable to store program code and/or associated data structures operable when executed by the processing circuitry to cause the processing circuitry to perform various functions and provide various features of the disclosed technology. In the example of FIG. 1, Storage Appliance 1 100 is shown including Memory 114, Storage Appliance 2 102 is shown including Memory 144, and Storage Appliance 3 104 is shown including Memory 174. Memory 114, Memory 144, and Memory 174 may each include or consist of volatile memory (e.g., RAM), and/or non-volatile memory, such as one or more ROMs, disk drives, solid state drives, and the like.

The memory in each storage appliance stores various specific program code that is executable by the processing circuitry of the storage appliance, and associated data structures used during the execution of the program code. For purposes of illustration, program code that is executable on storage appliance processing circuitry to cause the processing circuitry to perform the operations and functions of the technology described herein with regard to each storage appliance is shown by logical volume management program logic stored in the memory of each one of the storage appliances. For example, LV Management Logic 123 in Storage Appliance 1 100 is operable when executed to cause Processing Circuitry 108 to perform the operations and functions of the disclosed technology in Storage Appliance 1 100, LV Management Logic 153 in Storage Appliance 2 102 is operable when executed to cause Processing Circuitry 138 to perform the operations and functions of the disclosed technology in Storage Appliance 2 102, and LV Management Logic 183 is operable when executed to cause Processing Circuitry 168 to perform the operations and functions of the disclosed technology in Storage Appliance 3 104. Although certain program code and data structures are specifically shown in Memory 114, Memory 144, and Memory 174, each memory may additionally include various other program code and/or other software constructs that are not shown but are additional to those shown, and that are operable in whole or in part to perform specific functions and/or operations described herein. Such additional program logic and other software constructs may include without limitation an operating system, various applications, and/or other processes and/or data structures.

Each storage appliance in Storage Appliance Cluster 105 also includes storage mappings and allocations that store indications of units of non-volatile data storage space that are allocated from the storage devices in that storage appliance to various logical volumes and/or other data storage objects that are provided by that storage appliance. The units of storage space allocated to a given logical volume may be mapped to respective portions of that logical volume, and may be used to store host data directed to the logical volume in I/O operations (e.g. write I/O operations) that are received from Host Computer 106. A "slice" is one example of the units of storage space (e.g. 256 megabytes or 1 gigabytes in size) that may be allocated from a storage device to a storage object such as a logical volume. In the example of FIG. 1, Storage Mappings/Allocations 116 in Storage Appliance 1 100 store indications of units of storage space that are allocated from Storage Device(s) 112 to individual logical volumes provided by Storage Appliance 1 100 to Host Computer 106, and/or the mappings of such units of storage space to respective portions the logical volumes to which they are allocated. Storage Mappings/Allocations 146 in Storage Appliance 2 102 store indications of units of storage space that are allocated from Storage Device(s) 142 to individual logical volumes provided by Storage Appliance 2 102 to Host Computer 106, and/or the mappings of such units of storage space to respective portions the logical volumes to which they are allocated. Storage Mappings/Allocations 176 in Storage Appliance 3 104 store indications of units of storage space that are allocated from Storage Device(s) 172 to individual logical volumes provided by Storage Appliance 3 104 to Host Computer 106, and/or the mappings of such units of storage space to respective portions the logical volumes to which they are allocated.

The storage appliances in Storage Appliance Cluster 105 provide storage services that are consumed by Host Computer 106 (e.g. by one or more applications executing on Host Computer 106). Each one of the storage appliances in Storage Appliance Cluster 105 exposes a set of logical volumes (also sometimes referred to as logical units or "LUNS") to the Host Computer 106. In some embodiments, the storage services provided by the storage appliances in Storage Appliance Cluster 100 include one or more block-based storage services that provide Host Computer 106 with blocks of non-volatile storage from the logical volumes. Such block-based storage services may, for example, employ the Small Computer System Interface (SCSI) protocol, the Internet Small Computer System Interface (iSCSI) protocol, and/or Fibre Channel (FC) network technology to communicate between the Host Computer 106 and the storage appliances in the Storage Appliance Cluster 105.

While in the example of FIG. 1, Host Computer 106 is shown external to the Storage Appliance Cluster 105, the techniques described herein are not limited to such embodiments. Alternatively, Host Computer 106 may be located in whole or in part together with the storage appliances in Storage Appliance Cluster 105, as in the case of a hyper-converged storage array that hosts both storage and compute resources.

During operation of the components shown in FIG. 1, e.g. at least in part through execution of the logical volume management logic LV Management Logic 123, LV Management Logic 153, and/or LV Management Logic 183, a logical volume LV-1 is created. The logical volume LV-1 is created by i) creating a primary copy of LV-1 in one of the storage appliances, e.g. Storage Appliance 1 100, and ii) creating a shadow copy of LV-1 in each of one or more other storage appliances in the Storage Appliance Cluster 105, e.g. in Storage Appliance 2 102 and Storage Appliance 3 104. In the example of FIG. 1, LV-1 is created by creating LV-1 Primary Copy 120 in Storage Appliance 1 100, LV-1 Shadow Copy 150 in Storage Appliance 2 102, and LV-1 Shadow Copy 180 in Storage Appliance 3 104. While in the example of FIG. 1 Storage Appliance Cluster 105 includes three storage appliances, and accordingly shadow copies of LV-1 are created on two storage appliances, in examples in which greater numbers of storage appliances are contained in the Storage Appliance Cluster 105, those storage appliances not providing the primary copy of LV-1 would all have a shadow copy of LV-1 created thereon. Accordingly, in the case where Storage Appliance Cluster 105 includes four storage appliances, shadow copies of LV-1 would be created on three of the storage appliances, in the case where Storage Appliance Cluster 105 includes five storage appliances, shadow copies of LV-1 would be created on four of the storage appliances, and so on.

Creating the primary copy of the logical volume LV-1 in Storage Appliance 1 100 includes allocating units of non-volatile data storage from Storage Device(s) 112 to the primary copy of the logical volume to store host data written to the logical volume by I/O operations received from Host Computer 106. In the example of FIG. 1, creating LV-1 Primary Copy 120 includes allocating some number of units of non-volatile data storage from Storage Device(s) 112 to LV-1 Primary Copy 120, in order to store host data received in write I/O operations received by Storage Appliance 1 100 from Host Computer 106 over Path 190 that are directed to the logical volume LV-1. Indications of the specific units of non-volatile storage allocated to LV-1 Primary Copy 120, and of the mappings between those units of non-volatile storage and corresponding locations within LV-1 Primary Copy 120, are stored in Storage Mappings/Allocations 116, and shown for purposes of illustration in FIG. 1 by Mappings/Allocations 128.

In contrast, creating each one of the shadow copies of LV-1 on Storage Appliance 2 102 and Storage Appliance 3 104 includes allocating no units of non-volatile data storage from either Storage Device(s) 142 or Storage Device(s) 172 to the shadow copies. No units of non-volatile data storage in Storage Device(s) 142 or Storage Device(s) 172 are allocated to LV-1 Shadow Copy 150 or LV-1 Shadow Copy 180 to store host data received in write I/O operations directed to LV-1. Accordingly, there are no indications of units of non-volatile storage allocated from Storage Device(s) 142 to LV-1 Shadow Copy 150, or any indications of mappings between units of non-volatile storage in Storage Device(s) 142 to LV-1 Shadow Copy 150, that are added to Storage Mappings/Allocations 146 when LV-1 Shadow Copy 150 is created. Similarly, there are no indications of units of non-volatile storage allocated from Storage Device(s) 172 to LV-1 Shadow Copy 180, or any indications of mappings between units of non-volatile storage in Storage Device(s) 172 to LV-1 Shadow Copy 180, that are added to Storage Mappings/Allocations 176 when LV-1 Shadow Copy 180 is created.

Also at the time logical volume LV-1 is created, in response to creation of the logical volume LV-1, an initial path state for the logical volume is also created, shown for purposes of illustration in FIG. 1 by LV-1 Initial Path State 124. Initial Path State 124 is created by i) initially setting a path state of the data path between the Host Computer 106 and the storage appliance that contains the primary copy of LV-1 to an active state (e.g. Active-Optimized or Active-Non-Optimized), and ii) initially setting a path state of a data path between the host computer and the second storage appliance to unavailable. In the example of FIG. 1, setting the path state of the data path between Host Computer 106 and the storage appliance that contains the primary copy of LV-1, e.g. Storage Appliance 1 100, to an active state, includes setting the state of the Path 190 between Initiator Port 184 and Target Port 122 to an Active-Optimized or Active-Non-Optimized state in LV-1 Initial Path State 124. As also shown in the example of FIG. 1, setting the path state of the data path between Host Computer 106 and each storage appliance that contains a shadow copy of LV-1, e.g. Storage Appliance 2 102 and Storage Appliance 3 104, to unavailable, includes setting the state of the Path 192 between Initiator Port 186 and Target Port 152, and the state of the Path 194 between Initiator Port 188 and Target Port 182 to unavailable in LV-1 Initial Path State 124.

The active state of Path 190 indicates to Host Computer 106 (e.g. to a multi-path driver associated with LV-1 and executing in Host Computer 106) that Host Computer 106 is permitted to send I/O operations (e.g. I/O read and/or I/O write operations) that are directed to LV-1 over Path 190. The unavailable state of Path 192 indicates to Host Computer 106 (e.g. to the multi-path driver associated with LV-1 and executing in Host Computer 106) that Host Computer 106 is not permitted to send I/O operations directed to LV-1 over Path 192. Similarly, the unavailable state of Path 194 indicates to Host Computer 106 (e.g. to the multi-path driver associated with LV-1 and executing in Host Computer 106) that Host Computer 106 is not permitted to send I/O operations directed to LV-1 over Path 104.

LV-1 Initial Path State 124 may be a portion (e.g. a subset) of the Asymmetric Logical Unit Access (ALUA) state that is relevant to LV-1, and that is present in each one of the storage appliances that contains either the primary copy or a shadow copy of LV-1, as shown in the example of FIG. 1 by LV-1 ALUA State 118. ALUA is an industry standard protocol described in the T10 SCSI-3 specification SPC-3. LV-1 ALUA State 118 may be part of the ALUA state that is associated with and that may be obtained by Host Computer 106 with regard to each target port group that contains a target port through which either the primary or a shadow copy of LV-1 can be accessed. Accordingly, LV-1 ALUA State 118 may be the same in each of Storage Appliance 1 100, Storage Appliance 2 102, and Storage Appliance 3 104, and may be obtained by Host Computer 106 by issuing a SCSI Report Target Port Group (RTPG) command to a target port group that contains Target Port 122, by issuing an RTPG command to a target port group that contains Target Port 152, and/or by issuing an RTPG command to a target port group that contains Target Port 182.

Also at the time of and/or in response to the creation of LV-1, LV-1 Primary Copy 120, LV-1 Shadow Copy 150, and LV-1 Shadow Copy 180 are all made visible in Storage Appliance Cluster 105 to Host Computer 106 as LV-1. For example, LV-1 Primary Copy 120, LV-1 Shadow Copy 150, and LV-1 Shadow Copy 180 may be made visible by the storage appliances in Storage Appliance Cluster 105 to Host Computer 106 as LV-1 as least in part when Host Computer 106 performs a SCSI rescan operation across all the storage appliances in Storage Appliance Cluster 105 at the time LV-1 is created.

Also at the time of and/or in response to the creation of LV-1, LV-1 Initial Path State 124 may be provided to Host Computer 106. For example, Initial Path State 124 may be provided by one or more of the storage appliances in Storage Appliance Cluster 105 to Host Computer 106 at the time LV-1 is created in response to one or more host inquiries performed by Host Computer 106 at the time LV-1 is created. Because LV-1 Initial Path State 124 indicates an active state for Path 190, but indicates the unavailable state for Path 192 and Path 194, Initial Path State 124 causes Host Computer 106 to send host I/O operations (e.g. read I/O operations and write I/O operations) that are directed to LV-1 only over Path 190.

In some embodiments, LV-1 has a unique name, e.g. that is unique within the Storage Appliance Cluster 105, and making LV-1 Primary Copy 120, LV-1 Shadow Copy 150, and LV-1 Shadow Copy 180 all visible to Host Computer 106 as the logical volume also includes providing the unique name of LV-1 to Host Computer 106 as the name of each one of LV-1 Primary Copy 120, LV-1 Shadow Copy 150, and LV-1 Shadow Copy 180, e.g. in response to one or more status inquiries or the like received by the storage appliances in Storage Appliance Cluster 105 from Host Computer 106.

The unique name of LV-1 may, for example, be a SCSI World Wide Name (WWN) of LV-1. Providing the WWN of LV-1 to Host Computer 106 as the name of LV-1 Primary Copy 120 may, for example, be performed by sending the WWN of LV-1 to Host Computer 106 as the name of LV-1 Primary Copy 120 as part of a Vital Product Data (VPD) page sent to the host computer in response to a SCSI inquiry VPD page command sent from Host Computer 106 to Storage Appliance 1 100, and directed to LV-1 Primary Copy 120. For example, LV-1 WWN 126 may be returned in a VPD page that is returned from Storage Appliance 1 100.

Providing the WWN of LV-1 to Host Computer 106 as the name of LV-1 Shadow Copy 150 may, for example, be performed by sending the WWN of LV-1 to Host Computer 106 as the name of LV-1 Shadow Copy 150 as part of a VPD page sent to the host computer in response to a SCSI inquiry VPD page command sent from Host Computer 106 to Storage Appliance 2 102, and directed to LV-1 Shadow Copy 150. For example, LV-1 WWN 126 may be returned in a VPD page that is returned from Storage Appliance 2 102.

Providing the WWN of LV-1 to Host Computer 106 as the name of LV-1 Shadow Copy 180 may, for example, be performed by sending the WWN of LV-1 to Host Computer 106 as the name of LV-1 Shadow Copy 180 as part of a VPD page sent to the host computer in response to a SCSI inquiry VPD page command sent from Host Computer 106 to Storage Appliance 3 104, and directed to LV-1 Shadow Copy 180. For example, LV-1 WWN 126 may be returned in a VPD page returned from Storage Appliance 3 104.

While the unavailable state for Path 192 in LV-1 Initial Path State 118 prevents Host Computer 106 from sending I/O read and I/O write operations to LV-1 Shadow Copy 150 on Storage Appliance 2 102 over Path 192, it does not prevent Host Computer 106 from sending an RTPG command to Storage Appliance 2 102 over Path 192, and that is directed to LV-1 Shadow Copy 150 (e.g. that is directed to the target port group containing Target Port 152). Similarly, while the unavailable state for Path 194 in LV-1 Initial Path State 118 prevents Host Computer 106 from sending I/O read and I/O write operations to LV-1 Shadow Copy 180 on Storage Appliance 3 104 over Path 194, it does not prevent Host Computer 106 from sending an RTPG command to Storage Appliance 3 104 over Path 194, and that is directed to LV-1 Shadow Copy 180 (e.g. that is directed to the target port group containing Target Port 182).

In some embodiments, providing the LV-1 Initial Path State 124 to Host Computer 106 may include providing LV-1 Initial Path State 124 to Host Computer 106 in response to both i) a status inquiry sent from Host Computer 106 directed to LV-1 Primary Copy 120 on Storage Appliance 1 100, and/or ii) a status inquiry sent from Host Computer 106 directed to LV-1 Shadow Copy 150 on Storage Appliance 2 102 and/or LV-1 Shadow Copy 180 on Storage Appliance 3 104.

In some embodiments, the status inquiry sent from Host Computer 106 and directed to LV-1 Primary Copy 120 may be an RTPG command sent from Host Computer 106 over Path 190 and directed to LV-1 Primary Copy 120 (e.g. directed to the target port group containing Target Port 122).

In some embodiments, the status inquiry sent from Host Computer 106 and directed to LV-1 Shadow Copy 150 may be an RTPG command sent from Host Computer 106 over Path 192 and directed to LV-1 Shadow Copy 150 (e.g. directed to the target port group containing Target Port 152).

In some embodiments, the status inquiry sent from Host Computer 106 and directed to LV-1 Shadow Copy 180 may be an RTPG command sent from Host Computer 106 over Path 194 and directed to LV-1 Shadow Copy 180 (e.g. directed to the target port group containing Target Port 182).

Providing LV-1 Initial Path State 124 to Host Computer 106 may be accomplished by sending LV-1 Initial Path State 124 to Host Computer 106 i) as part of LV-1 ALUA State 118 sent to Host Computer 106 in response to an RTPG command sent from Host Computer 106 over Path 190 to Storage Appliance 1 100 and directed to LV-1 Primary Copy 120 (e.g. directed to the target port group containing Target Port 122), and ii) as part of LV-1 ALUA State 118 sent to Host Computer 106 in response to an RTPG command sent from Host Computer 106 over Path 192 to Storage Appliance 2 102 and directed to LV-1 Shadow Copy 150 (e.g. directed to the target port group containing Target Port 152), and iii) as part of LV-1 ALUA State 118 sent to Host Computer 106 in response to an RTPG command sent from Host Computer 106 over Path 194 to Storage Appliance 3 104 and directed to LV-1 Shadow Copy 180 (e.g. to the target port group containing Target Port 182).

Figure 2:
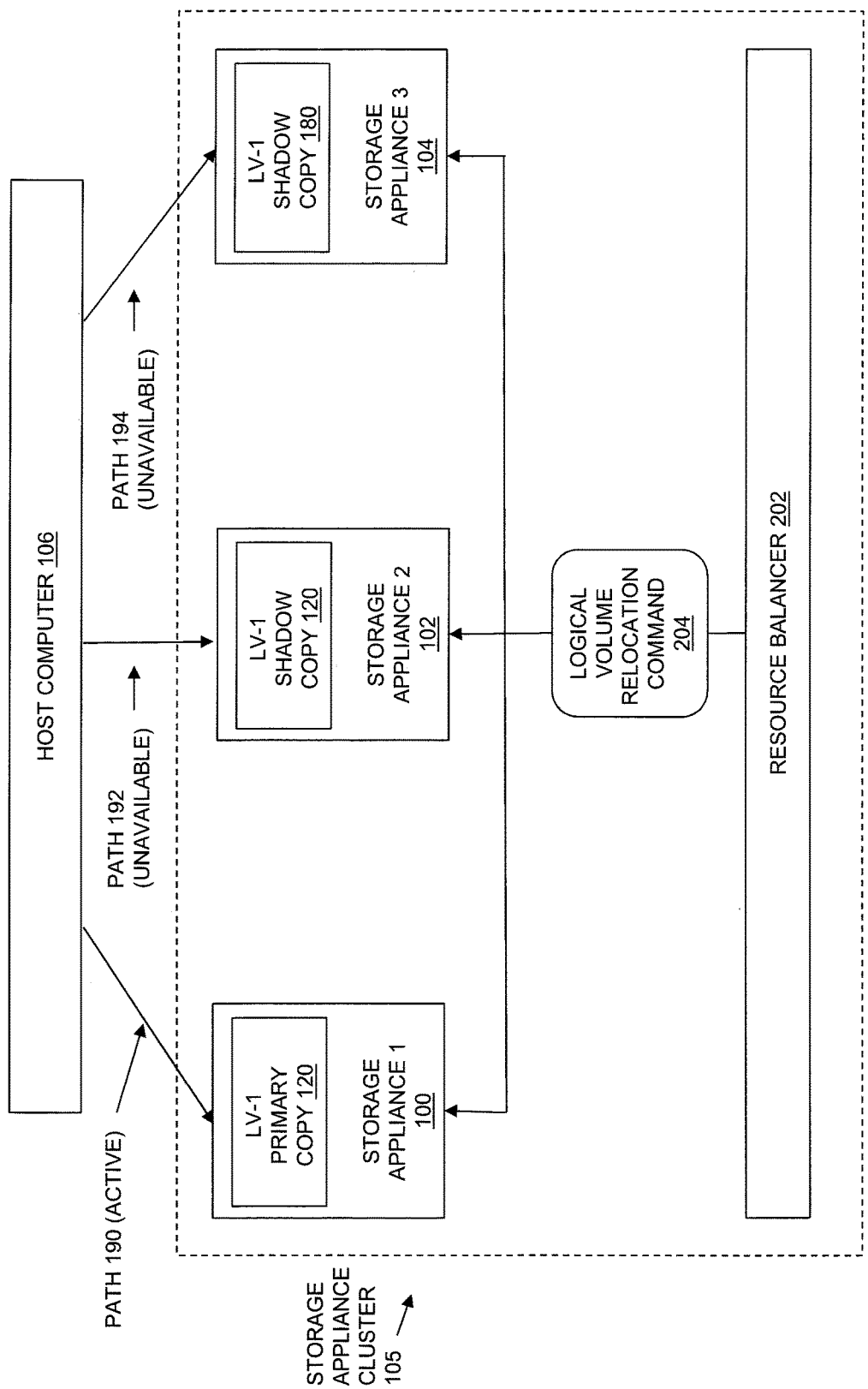
FIG. 2 is a block diagram showing an example of an operational environment including an embodiment of the disclosed technology, at a time subsequent to creation of the logical volume, when a logical volume relocation command is generated and received.

FIG. 2 is a block diagram showing an example of an operational environment including an embodiment of the disclosed technology, at a time subsequent to creation of the logical volume, when a logical volume relocation command is generated and received. As shown in FIG. 2, in some embodiments, host access to LV-1 may be moved from Storage Appliance 1 100 to one of the storage appliances providing one of the shadow copies of LV-1, e.g. to Storage Appliance 2 102, during a relocation operation performed in response to receipt of a relocation command by one or more of the storage appliances. For example, Storage Appliance Cluster 105 may include a Resource Balancer 202. Resource Balancer 202 may include or consist of program code executing on one or more of the storage appliances in Storage Appliance Cluster 105, and/or program code executing on a separate computer located within or external to Storage Appliance Cluster 105. Resource Balancer 202 may automatically detect circumstances that make it desirable to change the host access to LV-1 from Storage Appliance 1 100 to Storage Appliance 2 102. Examples of such circumstances include without limitation resource imbalances that may arise while providing host access to LV-1 on Storage Appliance 1 100, such as an inadequate amount of resources (e.g. storage, processing, and/or network resources) being available to support providing host access to LV-1 on Storage Appliance 1 100, and a sufficient or more sufficient amount of resources being available to support providing host access to LV-1 on Storage Appliance 2 102. Upon detection of such circumstances, Resource Balancer 202 may automatically convey a Logical Volume Relocation Command 204 to each of the storage appliances in Storage Appliance Cluster 105, indicating that host access to LV-1 is to be automatically moved from Storage Appliance 1 100 to Storage Appliance 2 102.

Figure 3:
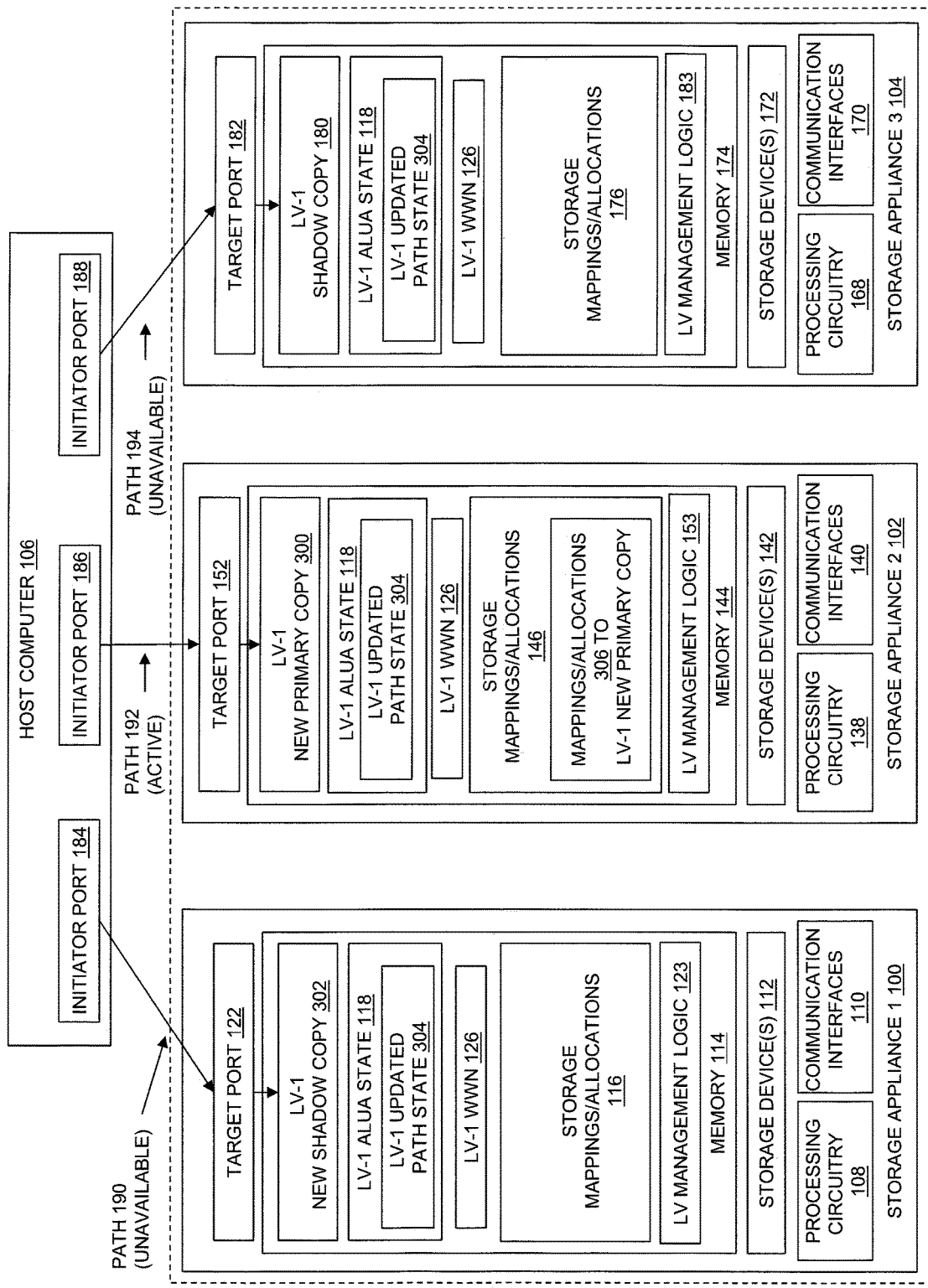
FIG. 3 is a block diagram showing an example of an operational environment including an embodiment of the disclosed technology, at a time subsequent to the generation and receipt of the logical volume relocation command, when host access to the logical volume is moved from one storage appliance to another storage appliance.

FIG. 3 is a block diagram showing an example of an operational environment including an embodiment of the disclosed technology, at a time subsequent to the generation and receipt of the logical volume relocation command, when host access to the logical volume is automatically moved from Storage Appliance 1 100 to Storage Appliance 2 102 in response to the Logical Volume Relocation Command 204 shown in FIG. 2. In response to the Logical Volume Relocation Command 204, a relocation operation may automatically be performed at least in part by execution of LV Management Logic 123, LV Management Logic 153, and LV Management Logic 183. The relocation operation includes creating an updated path state for LV-1, as shown by LV-1 Updated Path State 304. Creation of LV-1 Updated Path State 304 for LV-1 during the relocation operation may include i) updating the path state of the data path between Host Computer 106 and the storage appliance providing the primary copy of LV-1, e.g. Path 190 to Storage Appliance 1 100, to unavailable, and ii) updating the path state of a data path between Host Computer 106 and one of the storage appliances providing a shadow copy of LV-1, e.g. Path 192 to Storage Appliance 2 102, to an active state (e.g. Active-Optimized or Active-Non-Optimized). Updating the path state of Path 190 to unavailable indicates to Host Computer 106 that Host Computer 106 is no longer permitted to send I/O operations (e.g. read I/O and write I/O operations) that are directed to LV-1 over Path 190. Updating the path state of Path 192 to an active state indicates to Host Computer 106 that Host Computer 106 is subsequently permitted to send I/O operations (e.g. read I/O and write I/O operations) that are directed to LV-1 over Path 192.

In response to creation of LV-1 Updated Path State 304, the previous primary copy of LV-1, e.g. LV-1 Primary Copy 120 in Storage Appliance 1 100 (FIG. 1), may be changed to a shadow copy of LV-1, e.g. of the logical volume may be changed to a new shadow copy of the logical volume, e.g. LV-1 New Shadow Copy 302. Further in response to creation of LV-1 Updated Path State 304, the shadow copy of LV-1 in Storage Appliance 2 102, e.g. LV-1 Shadow Copy 150 (FIG. 1), may be changed to the new primary copy of the logical volume, e.g. LV-1 New Primary Copy 300.

LV-1 Updated Path State 304 may then be provided to Host Computer 106, e.g. from each one of the storage appliances in Storage Appliance Cluster 105 using the same techniques described herein for providing LV-1 Initial Path State 124 to Host Computer 106, albeit performed at the time host access to LV-1 is changed from Storage Appliance 1 100 to Storage Appliance 2 102. Providing LV-1 Updated Path State 304 to Host Computer 106 causes Host Computer 106 (e.g. the multi-path driver associated with LV-1 and executing in Host Computer 106) to subsequently send I/O operations (e.g. read I/O and write I/O operations) that are directed to LV-1 only to Storage Appliance 2 102 over Path 192.

It should be noted that LV-1 WWN 126 is not changed when host access to LV-1 is changed from Storage Appliance 1 100 to Storage Appliance 2 102, and LV-1 Updated Path Stage 304 is created and provided to Host Computer 106, since even after host access to LV-1 is changed from Storage Appliance 1 100 to Storage Appliance 2 102, the primary copy of LV-1 and all the shadow copies of LV-1 will provide LV-1 WWN 126 to Host Computer 106 as their name.

In some embodiments, moving host access to LV-1 from Storage Appliance 1 100 to Storage Appliance 2 102 may include allocating units of non-volatile data storage from Storage Device(s) 142 to LV-1 New Primary Copy 300 to store host data written by Host Computer 106 to LV-1, e.g. in write I/O operations directed to LV-1 and passed from Host Computer 106 to Storage Appliance 2 102 over Path 192. In such embodiments, indications of the specific units of non-volatile storage allocated to LV-1 New Primary Copy 300, and indications of the mappings between those units of non-volatile storage and corresponding locations within LV-1 New Primary Copy 300, may be stored in Storage Mappings/Allocations 146, and shown for purposes of illustration in FIG. 1 by Mappings/Allocations 306.

In some embodiments, moving host access to LV-1 from Storage Appliance 1 100 to Storage Appliance 2 102 may further include moving host data stored in the units of non-volatile data storage allocated from Storage Device(s) 112 to LV-1 Primary Copy 120 to the units of non-volatile data storage allocated from Storage Device(s) 142 to LV-1 New Primary Copy 300. Movement of such host data may be performed in whole or in part by pushing the host data from Storage Appliance 1 100 to Storage Appliance 2 102 in whole or in part prior to changing the host access to LV-1 from Storage Appliance 1 100 to Storage Appliance 2 102, and/or by pulling the host data to Storage Appliance 2 102 from Storage Appliance 1 100 in whole or in part after changing the host access to LV-1 from Storage Appliance 1 100 to Storage Appliance 2 102. In either case, moving the host data may include copying one or more snapshots (point in time copies) of LV-1 Primary Copy 120 to Storage Appliance 2 102 for storage by Storage Appliance 2 102 into units of Storage Device(s) 142 allocated to LV-1 New Primary Copy 300, and/or synchronously mirroring I/O operations that are directed to LV-1 to both Storage Appliance 1 100 and Storage Appliance 2 102 for some period of time, such that the I/O operations directed to LV-1 and received over one of Path 190 or Path 192 are synchronously performed on both Storage Appliance 1 100 and Storage Appliance 2 102, until all host data stored in the units of non-volatile data storage allocated from Storage Device(s) 112 to LV-1 Primary Copy 120 has been copied to the units of non-volatile data storage allocated from Storage Device(s) 142 to LV-1 New Primary Copy 300, and the contents of LV-1 New Primary Copy 300 is the same as the contents of LV-1 Primary 120. Such host data movement between Storage Appliance 1 100 and Storage Appliance 2 102 may be performed automatically in the background, e.g. through one or more communication paths external to Path 190, Path 192, and/or Path 194, so that the data movement is performed transparently with regard to Host Computer 106, and such that there is no interference with or interruption to the data storage services provided from the storage appliances in Storage Appliance Cluster 105 to Host Computer 106.

In some embodiments, host access to LV-1 may be moved to Storage Appliance 2 102 without allocating any units of non-volatile storage from Storage Device(s) 142 to store host data written to LV-1 in write I/O operations received by Storage Appliance 2 102 from Host Computer 106 over Path 192. In such embodiments, I/O operations directed to LV-1 and received by Storage Appliance 2 102 over Path 192 may, for example, be processed using units of non-volatile storage allocated to LV-1 New Primary Copy 300 from Storage Device(s) 112 in Storage Device 1 100, or alternatively using units of non-volatile storage allocated to LV-1 Primary Copy 120.

Figure 4:
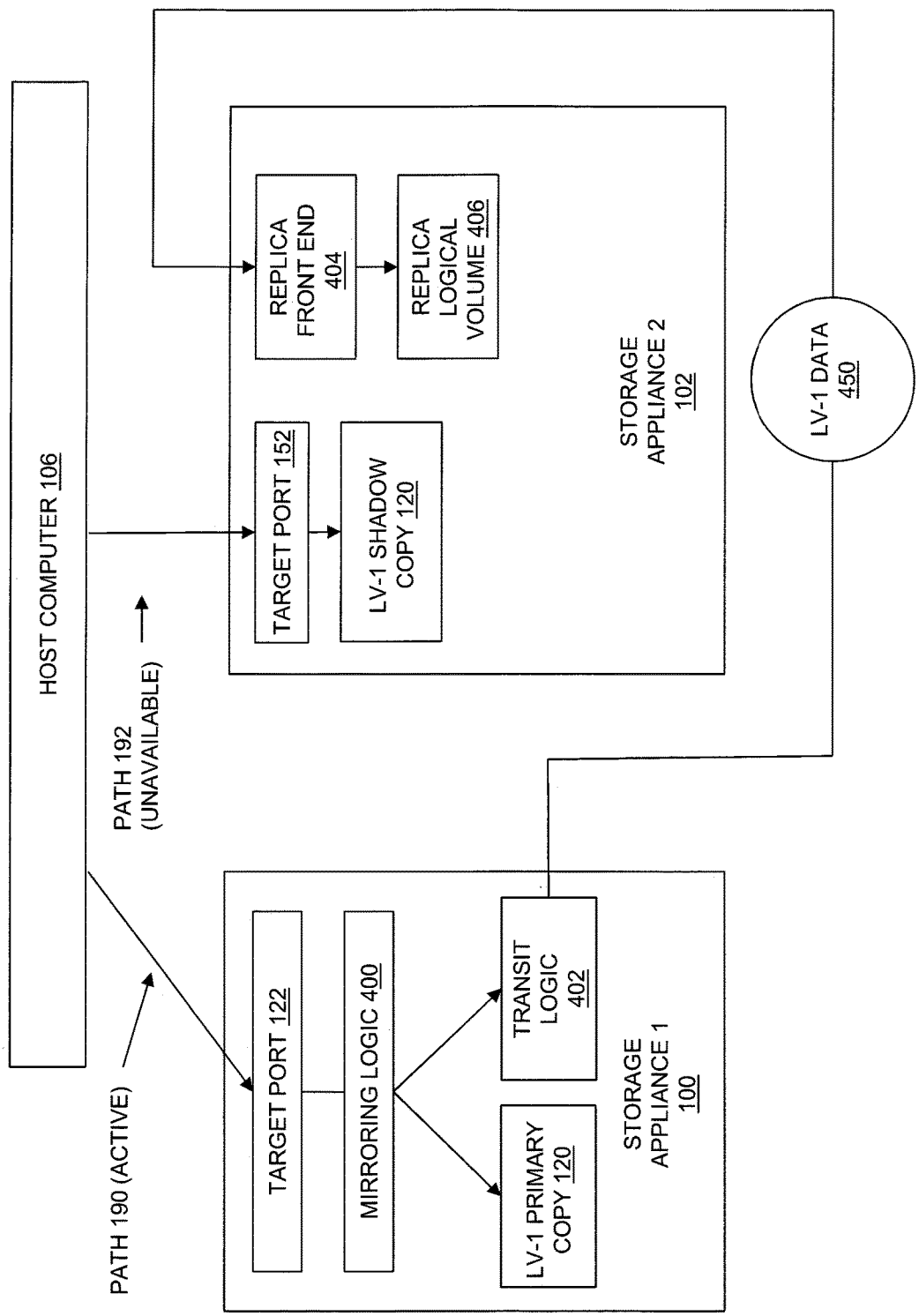
FIG. 4 is a block diagram showing an example of an operational environment and illustrating movement of logical volume data from one storage appliance to another storage appliance as may be performed in some embodiments.

FIG. 4 is a block diagram showing an example of an operational environment and illustrating movement of logical volume data from LV-1 Primary Copy 120 in Storage Appliance 1 100 to Storage Appliance 2 102 in some embodiments. In FIG. 4, LV-1 Data 450 represents data that may be moved between LV-1 Primary Copy 120 in Storage Appliance 1 100 and Storage Appliance 2 102 when host access to LV-1 is changed from Storage Appliance 1 100 to Storage Appliance 2 102. As shown in FIG. 4, LV-1 Data 450 may be passed from a Transit Logic 402 in Storage Appliance 1 100 to a Replica Front End 404 in Storage Appliance 2 102, and then stored by Replica Front End 404 into a Replica Logical Volume 406 in Storage Appliance 2 102. Transit Logic 402 and Replica Front End 404 are operable to pass data between in Storage Appliance 1 100 and Storage Appliance 2 102, and are logically and/or physically separate from Target Port 122 and Target Port 152 and/or any other target ports in Storage Appliance 1 100 and/or Storage Appliance 2 102 that provide communications with Host Computer 106. In this way, Transit Logic 402 and Replica Front End 404 enable Storage Appliance 1 100 to communicate with Storage Appliance 2 102 independently with regard to any data paths between Host Computer 106 and Storage Appliance 1 100 and/or Storage Appliance 2 102.

In some embodiments, LV-1 Data 450 may include one or more snapshots of LV-1 Primary Copy 120 that are point in time copies of the contents of LV-1 Primary Copy 120.

In some embodiments, LV-1 Data 450 may further include a "delta" of host data written to LV-1 Primary Copy 120 and collected in Storage Appliance 1 100 after a point in time at which the last snapshot of LV-1 Primary Copy 120 that was sent to Storage Appliance 2 102 was captured.

In some embodiments, after the "delta" of host data captured in Storage Appliance 1 100 is collected and/or sent to Storage Appliance 2 102 as part of LV-1 Data 450, write I/O operations directed to LV-1 that are received by Storage Appliance 1 100 from Host Computer 106 over Path 190 may be synchronously mirrored to the Replica Logical Volume 406. For example, Mirroring Logic 400 in Storage Appliance 1 100 may synchronously mirror write I/O operations directed LV-1 that are received by Storage Appliance 1 100 over Path 190, such that the write I/O operations directed to LV-1 are both i) applied to LV-1 Primary Copy 120, and also ii) passed to Transit Logic 402. Transit Logic 402 then conveys the mirrored write I/O operations to Replica Front End 404 in Storage Appliance 2 102 and applied by Replica Front End 404 to Replica Logical Volume 406. The synchronously mirrored write I/O operations are only acknowledged as completed to Host Computer 106 after they have been successfully applied to both LV-1 Primary Copy 120 and Replica Logical Volume 406.

Replica Front End 404 writes LV-1 Data 450 until a point in time at which LV-1 Primary Copy 120 and Replica Logical Volume 406 are completely synchronized, such that all data stored in LV-Primary Copy 120 is also stored in Replica Logical Volume 406, and write I/O operations being received over Path 190 are being synchronously mirrored to both LV-Primary Copy 120 and Replica Logical Volume 406. At that time, host access to LV-1 may be disabled, e.g. access to LV-1 may be disabled with regard to all paths to storage appliances in Storage Appliance Cluster 105. All pending I/O operations directed to LV-1 that are contained in Storage Appliance 1 100 and/or Storage Appliance 2 102 at the time host access to LV-1 is disabled are then completed. While host access to LV-1 is disabled, LV-1 Updated Path State 304 may be created and stored into LV-1 ALUA State 118 in each one of the storage appliances in Storage Appliance Cluster 105. Also while host access to LV-1 is disabled, Replica Logical Volume 406 may be changed to LV-1 New Primary Copy 300. Since the unique name of LV-1 has not changed, there is no need to modify LV-1 WWN 126 in any of the storage volumes.

Subsequently, when host access to LV-1 is re-enabled, Host Computer 106 is provided with LV-1 Updated Path State 304 in the LV-1 ALUA State 118 that is provided from any one of the storage appliances in the Storage Appliance Cluster 105 as described above. LV-1 Updated Path State 304 indicates that LV-1 is to be accessed by Host Computer 106 only on Storage Appliance 1 102 over Path 192, based on the active state of Path 192 in LV-1 Updated Path State 304, and based also on the unavailable state of Path 190 and Path 194 in LV-1 Updated Path State 304.

FIG. 5 is a flow chart showing an example of steps performed in some embodiments. At step 500, a logical volume is initially created by i) creating a primary copy of the logical volume in a first storage appliance in a cluster of storage appliances, and ii) creating a shadow copy of the logical volume in at least a second storage appliance in the cluster of storage appliances. Creating the primary copy of the logical volume in the first storage appliance includes allocating units of non-volatile data storage from data storage devices of the first storage appliance to the primary copy of the logical volume to store host data written to the logical volume. Creating the shadow copy of the logical volume in the second storage appliance and/or any other storage appliance in the cluster includes allocating no units of non-volatile data storage from data storage devices in those storage devices to any shadow copy of the logical volume to store host data.

In step 502, in response to creation of the logical volume, and at the time the logical volume is created, steps 504, 506, and 508 are performed.

At step 504, an initial path state of the logical volume is created. Creating the initial path state of the logical volume includes initially setting a path state of a data path between the host computer and the first storage appliance to active. The active state of the data path between the host computer and the first storage appliance indicates to the host computer that the host computer is permitted to send I/O operations (e.g. read I/O and/or write I/O operations) that are directed to the logical volume over the data path between the host computer and the first storage appliance. Creating the initial path state of the logical volume also includes initially setting a path state of a data path between the host computer and the second storage appliance to unavailable. The unavailable state of the data path between the host computer and the second storage appliance indicates to the host computer that the host computer is not permitted to send I/O operations (e.g. read I/O and/or write I/O operations) that are directed to the logical volume over the data path between the host computer and the second storage appliance.

At step 506, both the primary copy of the logical volume and the shadow copy of the logical volume are made visible to the host computer as the logical volume.

At step 508, the initial path state of the logical volume is provided to the host computer. The initial path state of the logical volume causes the host computer to send I/O operations directed to the logical volume only over the data path between the host computer and the first storage appliance.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of supporting movement of a logical volume between storage appliances in a cluster of storage appliances, comprising:
creating the logical volume by i) creating a primary copy of the logical volume in a first storage appliance in the cluster of storage appliances, wherein creating the primary copy of the logical volume in the first storage appliance includes allocating units of non-volatile data storage from data storage devices of the first storage appliance to the primary copy of the logical volume to store host data written to the logical volume, and ii) creating a shadow copy of the logical volume in at least a second storage appliance in the cluster of storage appliances, wherein creating the shadow copy of the logical volume in the second storage appliance includes allocating no units of non-volatile data storage from data storage devices of the second storage appliance to the shadow copy of the logical volume to store host data; and
in response to creation of the logical volume:
creating an initial path state of the logical volume, at least in part by i) initially setting a path state of a data path between the host computer and the first storage appliance to active, wherein the active state of the data path between the host computer and the first storage appliance indicates to the host computer that the host computer is permitted to send I/O operations directed to the logical volume over the data path between the host computer and the first storage appliance, and ii) initially setting a path state of a data path between the host computer and the second storage appliance to unavailable, wherein the unavailable state of the data path between the host computer and the second storage appliance indicates to the host computer that the host computer is not permitted to send I/O operations directed to the logical volume over the data path between the host computer and the second storage appliance,
making both the primary copy of the logical volume and the shadow copy of the logical volume visible to the host computer as the logical volume, and
providing the initial path state of the logical volume to the host computer, wherein the initial path state of the logical volume causes the host computer to send I/O operations directed to the logical volume only over the data path between the host computer and the first storage appliance.

2. The method of claim 1, wherein the logical volume has a unique name; and
wherein making both the primary copy of the logical volume and the shadow copy of the logical volume visible to the host computer as the logical volume further comprises sending the unique name of the logical volume to the host computer as a name for both the primary copy of the logical volume and the shadow copy of the logical volume.

3. The method of claim 2, wherein providing the initial path state of the logical volume to the host computer comprises sending the initial path state of the logical volume to the host computer in response to both i) a status inquiry from the host computer directed to the primary copy of the logical volume, and ii) a status inquiry from the host computer directed to the shadow copy of the logical volume.

4. The method of claim 3, wherein the data path between the host computer and the first storage appliance extends at least in part between an initiator port on the host computer and a target port on the first storage appliance; and
wherein the data path between the host computer and the second storage appliance extends at least in part between an initiator port on the host computer and a target port on the second storage appliance.

5. The method of claim 3, wherein the status inquiry from the host computer directed to the primary copy of the logical volume comprises a Report Target Port Group (RTPG) command from the host computer directed to the primary copy of the logical volume; and
wherein the status inquiry from the host computer directed to the shadow copy of the logical volume comprises a Report Target Port Group (RTPG) command from the host computer directed to the shadow copy of the logical volume.

6. The method of claim 5, wherein sending the initial path state of the logical volume to the host computer comprises sending the initial path state of the logical volume to the host computer i) as part of an Asymmetrical Logical Unit Access (ALUA) state of the primary copy of the logical volume sent to the host computer in response to the Report Target Port Group (RTPG) command from the host computer directed to the primary copy of the logical volume, and ii) as part of an Asymmetrical Logical Unit Access (ALUA) state of the shadow copy of the logical volume sent to the host computer in response to the Report Target Port Group (RTPG) command from the host computer directed to the shadow copy of the logical volume.

7. The method of claim 6, wherein the unique name of the logical volume comprises a World Wide Name (WWN) of the logical volume, and wherein sending the unique name of the logical volume to the host computer as a name for both the primary copy of the logical volume and the shadow copy of the logical volume comprises i) sending the World Wide Name of the logical volume to the host computer as the name of the primary copy of the logical volume as part of a Vital Product Data (VPD) page sent to the host computer in response to a SCSI inquiry command from the host computer sent to the first storage appliance, and ii) sending the World Wide Name (WWN) of the logical volume to the host computer as the name of the shadow copy of the logical volume as part of a Vital Product Data (VPD) page sent to the host computer in response to a SCSI inquiry command from the host computer sent to the second storage appliance.

8. The method of claim 1, further comprising
receiving a relocation command for the logical volume, the relocation command indicating that host access to the logical volume is to be moved from the first storage appliance to the second storage appliance; and
in response to the relocation command, performing a relocation operation at least in part by:
creating an updated path state of the logical volume, at least in part by i) updating the path state of the data path between the host computer and the first storage appliance to unavailable, wherein the unavailable state of the data path between the host computer and the first storage appliance indicates to the host computer that the host computer is not permitted to send I/O operations directed to the logical volume over the data path between the host computer and the first storage appliance, and ii) updating the path state of the data path between the host computer and the second storage appliance to active, wherein the active state of the data path between the host computer and the second storage appliance indicates to the host computer that the host computer is permitted to send I/O operations directed to the logical volume over the data path between the host computer and the second storage appliance,
changing the primary copy of the logical volume to a new shadow copy of the logical volume,
changing the shadow copy of the logical volume to a new primary copy of the logical volume, and
providing the updated path state of the logical volume to the host computer, wherein the updated path state of the logical volume causes the host computer to subsequently send host I/O operations directed to the logical volume only over the data path between the host computer and the second storage appliance.

9. The method of claim 8, wherein moving the logical volume from the first storage appliance to the second storage appliance further includes allocating units of non-volatile data storage from data storage devices of the second storage appliance to the new primary copy of the logical volume to store host data written to the logical volume.

10. The method of claim 9, wherein moving the logical volume from the first storage appliance to the second storage appliance further includes moving host data stored in the units of non-volatile data storage allocated from data storage devices of the first storage appliance to the primary copy of the logical volume to the units of non-volatile data storage allocated from data storage devices of the second storage appliance to the new primary copy of the logical volume.

11. The method of claim 1, wherein the cluster of storage appliances includes more than two storage appliances, and wherein creating the logical volume further comprises creating a shadow copy of the logical volume on each storage appliance in the cluster of storage appliances other than the first storage appliance.

12. A non-transitory computer readable medium for supporting movement of a logical volume between storage appliances in a cluster of storage appliances, the non-transitory medium having a set of instructions stored thereon, the set of instructions, when executed on processing circuitry, cause the processing circuitry to perform the steps of:
creating the logical volume by i) creating a primary copy of the logical volume in a first storage appliance in the cluster of storage appliances, wherein creating the primary copy of the logical volume in the first storage appliance includes allocating units of non-volatile data storage from data storage devices of the first storage appliance to the primary copy of the logical volume to store host data written to the logical volume, and ii) creating a shadow copy of the logical volume in at least a second storage appliance in the cluster of storage appliances, wherein creating the shadow copy of the logical volume in the second storage appliance includes allocating no units of non-volatile data storage from data storage devices of the second storage appliance to the shadow copy of the logical volume to store host data; and in response to creation of the logical volume:
creating an initial path state of the logical volume, at least in part by i) initially setting a path state of a data path between the host computer and the first storage appliance to active, wherein the active state of the data path between the host computer and the first storage appliance indicates to the host computer that the host computer is permitted to send I/O operations directed to the logical volume over the data path between the host computer and the first storage appliance, and ii) initially setting a path state of a data path between the host computer and the second storage appliance to unavailable, wherein the unavailable state of the data path between the host computer and the second storage appliance indicates to the host computer that the host computer is not permitted to send I/O operations directed to the logical volume over the data path between the host computer and the second storage appliance, making both the primary copy of the logical volume and the shadow copy of the logical volume visible to the host computer as the logical volume, and providing the initial path state of the logical volume to the host computer, wherein the initial path state of the logical volume causes the host computer to send I/O operations directed to the logical volume only over the data path between the host computer and the first storage appliance.

13. The non-transitory computer readable medium of claim 12, wherein the logical volume has a unique name; and
wherein making both the primary copy of the logical volume and the shadow copy of the logical volume visible to the host computer as the logical volume further comprises sending the unique name of the logical volume to the host computer as a name for both the primary copy of the logical volume and the shadow copy of the logical volume.

14. The non-transitory computer readable medium of claim 13, wherein providing the initial path state of the logical volume to the host computer comprises sending the initial path state of the logical volume to the host computer in response to both i) a status inquiry from the host computer directed to the primary copy of the logical volume, and ii) a status inquiry from the host computer directed to the shadow copy of the logical volume.

15. A system for supporting movement of a logical volume between storage appliances in a cluster of storage appliances, the system comprising:
processing circuitry;
memory having program code stored thereon that is executable on the processing circuitry, wherein the program code, when executed on the processing circuitry, causes the processing circuitry to:
create the logical volume by i) creating a primary copy of the logical volume in a first storage appliance in the cluster of storage appliances, wherein creating the primary copy of the logical volume in the first storage appliance includes allocating units of non-volatile data storage from data storage devices of the first storage appliance to the primary copy of the logical volume to store host data written to the logical volume, and ii) creating a shadow copy of the logical volume in at least a second storage appliance in the cluster of storage appliances, wherein creating the shadow copy of the logical volume in the second storage appliance includes allocating no units of non-volatile data storage from data storage devices of the second storage appliance to the shadow copy of the logical volume to store host data; and in response to creation of the logical volume:
create an initial path state of the logical volume, at least in part by i) initially setting a path state of a data path between the host computer and the first storage appliance to active, wherein the active state of the data path between the host computer and the first storage appliance indicates to the host computer that the host computer is permitted to send I/O operations directed to the logical volume over the data path between the host computer and the first storage appliance, and ii) initially setting a path state of a data path between the host computer and the second storage appliance to unavailable, wherein the unavailable state of the data path between the host computer and the second storage appliance indicates to the host computer that the host computer is not permitted to send I/O operations directed to the logical volume over the data path between the host computer and the second storage appliance, make both the primary copy of the logical volume and the shadow copy of the logical volume visible to the host computer as the logical volume, and provide the initial path state of the logical volume to the host computer, wherein the initial path state of the logical volume causes the host computer to send I/O operations directed to the logical volume only over the data path between the host computer and the first storage appliance.

* * * * *